(12) United States Patent
Nguyen

(10) Patent No.: US 7,085,916 B1
(45) Date of Patent: Aug. 1, 2006

(54) EFFICIENT INSTRUCTION PREFETCH MECHANISM EMPLOYING SELECTIVE VALIDITY OF CACHED INSTRUCTIONS FOR DIGITAL SIGNAL PROCESSOR AND METHOD OF OPERATION THEREOF

(75) Inventor: Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 454 days.

(21) Appl. No.: 10/066,150

(22) Filed: Oct. 26, 2001

(51) Int. Cl.
G06F 9/00 (2006.01)

(52) U.S. Cl. ..................... 712/207; 712/241

(58) Field of Classification Search ........ 712/205–207, 712/233–241
See application file for complete search history.

(56) References Cited

U.S. PATENT DOCUMENTS 4,910,664 A * 3/1990 Arizono ...................... 712/241
4,965,722 A * 10/1990 Tokuume .................... 711/106
5,784,603 A * 7/1998 Leung et al. ................ 712/234
5,835,435 A * 11/1998 Bogin et al. ................. 365/227
6,243,807 B1 * 6/2001 Chi ............................. 712/241

* cited by examiner

Primary Examiner—Henry W. H. Tsai
Assistant Examiner—Tonia L. Meonske
(74) Attorney, Agent, or Firm—Hitt Gaines PC

(57) ABSTRACT

For use in a processor having an external memory interface, an instruction prefetch mechanism, a method of prefetching instructions and a digital signal processor incorporating the mechanism or the method. In one embodiment, the mechanism includes: (1) a branch predictor that predicts whether a branch is to be taken, (2) prefetch circuitry, coupled to the branch predictor, that prefetches instructions associated with the branch via the external memory interface if the branch is taken and prefetches sequential instructions via the external memory interface if the branch is not taken and (3) a loop recognizer, coupled to the prefetch circuitry, that determines whether a loop is present in fetched instructions and reinstates a validity of instructions in the loop and prevents the prefetch circuitry from prefetching instructions outside of the loop until the loop completes execution.

20 Claims, 4 Drawing Sheets

EFFICIENT INSTRUCTION PREFETCH MECHANISM EMPLOYING SELECTIVE VALIDITY OF CACHED INSTRUCTIONS FOR DIGITAL SIGNAL PROCESSOR AND METHOD OF OPERATION THEREOF

TECHNICAL FIELD OF THE INVENTION

The present invention is directed, in general, to digital signal processors (DSPs) and, more specifically, to an efficient instruction prefetch mechanism for a DSP and a method of prefetching instructions for execution in a DSP.

BACKGROUND OF THE INVENTION

Over the last several years, DSPs have become an important tool, particularly in the real-time modification of signal streams. They have found use in all manner of electronic devices and will continue to grow in power and popularity.

Those skilled in the art are familiar with DSP architecture in general. Conventional DSPs employ a pipeline through which pass data representing a signal to be processed. An execution core performs various mathematical and logical operations on the data to effect changes therein. Memory is coupled to the execution core. The memory contains not only instructions concerning the way in which the data are to be modified, but also further data that may be employed in conjunction with executing the instructions.

It becomes important at this point to discuss two details with respect to the way in which DSP memory may be architected. First, two fundamental DSP architectures exist that are distinguished from one another by how they interact with memory. So-called "von Neumann" architecture DSPs unify instructions and data in a single memory and a single bus. So-called "Harvard" architecture DSPs split instructions and data between two separate memories and buses. The tradeoff is simplicity (von Neumann) versus speed (Harvard).

Second, more sophisticated DSPs stratify memory in an effort to balance speed, cost and power consumption. In a perfect and simple world, a DSP's memory would be extremely fast, low power, arbitrarily large and on the same physical substrate. Unfortunately, very fast memory is very expensive and requires lots of power and arbitrarily large memory takes an arbitrarily large amount of room on a given substrate. Tempering those requirements with today's commercial concerns regarding both chip and system cost, flexibility and power consumption, modern DSP architecture calls for memory to be stratified, perhaps into three or more layers.

Assuming for the moment that three layers are desired, those might be (1) an extremely small, fast cache, located on the same physical substrate as the processing core of the DSP, that contains very little, but highly relevant instructions or data, (2) a somewhat larger, somewhat slower memory, still located on the same physical substrate as the processing core of the DSP, that contains relevant instructions or data and (3) an external memory that is as large as need be to contain the entirety of a program and data that the DSP is to use, but that is located on a separate physical substrate and accessible only through a comparatively slow external memory interface. While keeping the external memory on a separate substrate increases flexibility in system design and allows the DSP's chip size to remain small, external memory requires its own power. Therefore, every external memory access comes at the cost of some power consumption that should be minimized in power-consumption-sensitive (typically battery-powered) systems. It should also be noted that processors of all types, including ubiquitous microprocessors, employ the same stratification strategy to balance their speed and cost goals.

Given this memory stratification, designers have set about for years to increase performance by developing a number of schemes to avoid latencies and power consumption associated with gaining access to more distant echelons of memory for purposes of loading instructions or loading and storing data. Intelligent guesses concerning instructions and data that may be useful in the near future can be employed to great advantage to retrieve ahead of time (or "prefetch") such instructions or data into faster memory. However, further improvement remains possible.

Accordingly, what is needed in the art is a better way to manage stratified memory to increase processor performance. More specifically, what is needed is a mechanism that prefetches instructions into a processor more effectively, such that processor performance (speed and power consumption) is improved. Most specifically, a mechanism to improve overall DSP performance is a primary objective.

SUMMARY OF THE INVENTION

To address the above-discussed deficiencies of the prior art, the present invention provides, for use in a processor having an external memory interface, an instruction prefetch mechanism, a method of prefetching instructions and a digital signal processor incorporating the mechanism or the method. In one embodiment, the mechanism includes: (1) a branch predictor that predicts whether a branch is to be taken, (2) prefetch circuitry, coupled to the branch predictor, that prefetches instructions associated with the branch via the external memory interface if the branch is taken and prefetches sequential instructions via the external memory interface if the branch is not taken and (3) a loop recognizer, coupled to the prefetch circuitry, that determines whether a loop is present in fetched instructions and reinstates a validity of instructions in the loop and prevents the prefetch circuitry from prefetching instructions outside of the loop until the loop completes execution. (In the embodiment to be illustrated and described, the loop recognizer is actually part of the prefetch circuitry inasmuch as they are both embodied in a single state machine.)

The present invention therefore introduces a prefetch scheme having a prefetch capability based on both branch prediction and loop recognition. Instructions are normally prefetched based on branch predictions. When a loop is encountered, the instructions in the loop are maintained in faster memory as much as possible and reused until execution of the loop is complete. The present invention enjoys substantial utility in that memory latencies associated with external memory are diminished, and power losses associated with loads from external memory are likewise avoided.

In one embodiment of the present invention, the external memory interface is a synchronous memory interface. Those skilled in the art will understand, however, that other forms of external memory may benefit from application of the present invention.

In one embodiment of the present invention, the prefetch circuitry prefetches four of the instructions at a time. In an embodiment to be illustrated and described, the instructions are 16 bits wide. Brought in four at a time, the instructions are stored in a data space within an instruction cache that is 64 bits wide. Of course, other instruction and cache widths and fetch quantities are within the broad scope of the present invention.

In one embodiment of the present invention, the prefetch circuitry causes the instructions to be placed in a direct mapped instruction cache in the processor. A direct mapped instruction cache offers certain architectural advantages, primarily simplicity. Of course, other cache architectures are within the broad scope of the present invention.

In one embodiment of the present invention, the prefetch circuitry drives a request arbiter in the processor. The request arbiter arbitrates requests from a data unit and an instruction unit of the processor. Of course, this need not be the case.

In one embodiment of the present invention, the prefetch circuitry is embodied in a state machine. Those skilled in the pertinent art will understand the efficacy of using a state machine to enable the prefetch mechanism of the present invention. Of course, other types of circuitry can be employed to enable the mechanism, and may be advantageous in a particular environment or application.

In one embodiment of the present invention, the processor is a digital signal processor. The teachings and principles of the present invention may, however, be applied to processors in general, including microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
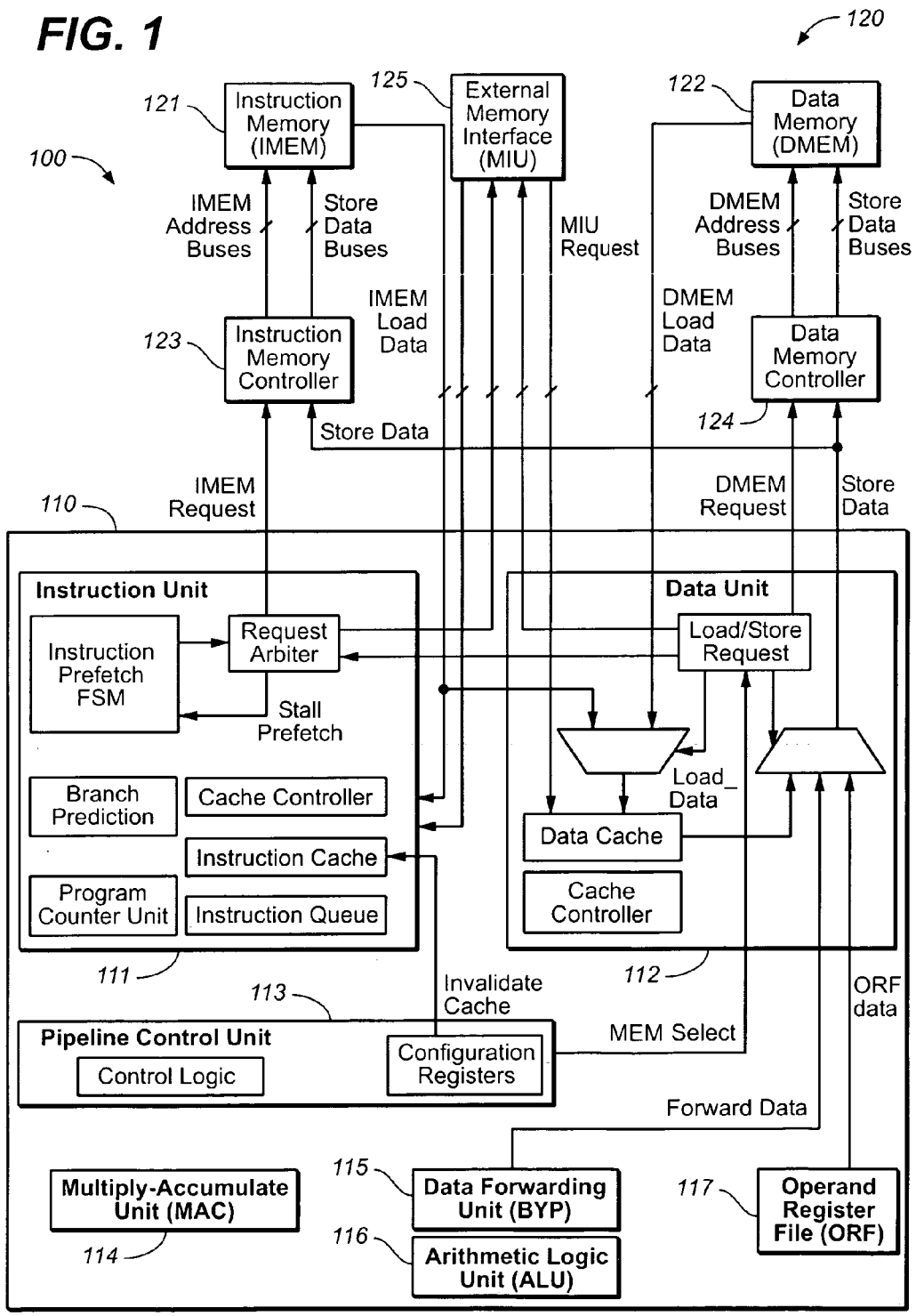
FIG. 1 illustrates an exemplary DSP which may form an environment within which an instruction prefetch mechanism constructed according to the principles of the present invention can operate.

Referring initially to FIG. 1, illustrated is an exemplary DSP, generally designated 100, which may form an environment within which an instruction prefetch mechanism constructed according to the principles of the present invention can operate. Although the DSP 100 will now be described, those skilled in the pertinent art should understand that, apart from the novel instruction prefetch mechanism, the DSP 100 is essentially conventional. Those skilled in the pertinent art should also understand that the instruction prefetch mechanism can operate within the confines of other conventional or later-discovered DSP or general-purpose, non-DSP, processor architectures.

The DSP 100 contains an execution core 110 and a memory unit 120 that are located on the same physical substrate. The execution core 110 contains an instruction unit 111. The instruction unit 111 is responsible for ensuring that instructions are properly decoded, fetched, tracked and queued for execution. Besides containing control circuitry for performing these functions, the instruction unit 111 contains an instruction cache to allow instructions to be fetched as a batch and executed sequentially, thereby avoiding latencies that would be encountered were each instruction to be retrieved from memory individually. Inasmuch as the prefetch mechanism of the present invention is directed to increasing the overall speed of instruction retrieval, the instruction unit 111 is the preferred place for locating the prefetch mechanism.

The execution core 110 also contains a data unit 112. The data unit 112 is responsible for managing data transfer (loads and stores) between memory and register storage (to be discussed below). The data unit 112 also contains a data cache that allows data to be loaded or stored as a batch.

In a normal operating environment, the DSP 100 operates on a stream of data. Accordingly, the execution core 110 of the DSP 100 is adapted to receive the data stream into a pipeline (not shown, but comprising several stages). The pipeline is under control of a pipeline control unit 113. The pipeline control unit 113 is responsible for moving the data stream through the pipeline and for ensuring that the data stream is operated on properly. Accordingly, the pipeline control unit 113 coordinates the instruction unit 111 and the data unit 112 to ensure that instructions and their corresponding data are synchronized with the data stream in the pipeline.

Several ancillary units assist in the execution of instructions. A multiply-accumulate unit 114 performs multiplication and division calculations and calculations that are substantially based on multiplication or division. A data forwarding unit 115 ensures that results of earlier data processing in the execution core 111 are available for subsequent processing without undue latency. An arithmetic logic 116 unit performs all other general mathematical and logical operations (such as addition, subtraction, shifting, rotating and Boolean operations) that the multiply-accumulate unit 114 is not called upon to do. Finally, an operand register file 117 provides extremely fast, flexible registers that store operands being processed.

The memory unit 120 contains the so-called "local memory" that, while slower than the instruction cache of the instruction unit 111, the data cache of the data unit 112 or the registers contained within the operand register file 117, is nonetheless substantially faster than external memory (not shown, but conventional and not located on the same physical substrate as the DSP 100). The memory unit 120 contains both instruction memory 121 and data memory 122. The instruction memory 121 is managed by an instruction memory controller 123, while the data memory 122 is managed by a data memory controller 124. An external memory interface 125 can be coupled to external memory.

The memory architecture of the DSP 100 is typical of conventional DSPs and microprocessors. That is, its registers are fast but small; its instruction and date caches are larger, but still inadequate to hold more than a handful of instructions or data; its instruction memory 121 and data memory 122 are larger still, but inadequate to hold an entire program. Thus, the external memory is ultimately required to hold the entirety of a typical program which may be desired to execute in the DSP 100. Unfortunately, as described above, the external memory has significant load and store latencies associated with it. An object of the present invention is further to avoid those latencies and thereby to increase the apparent speed of instruction loads.

Figure 2A:
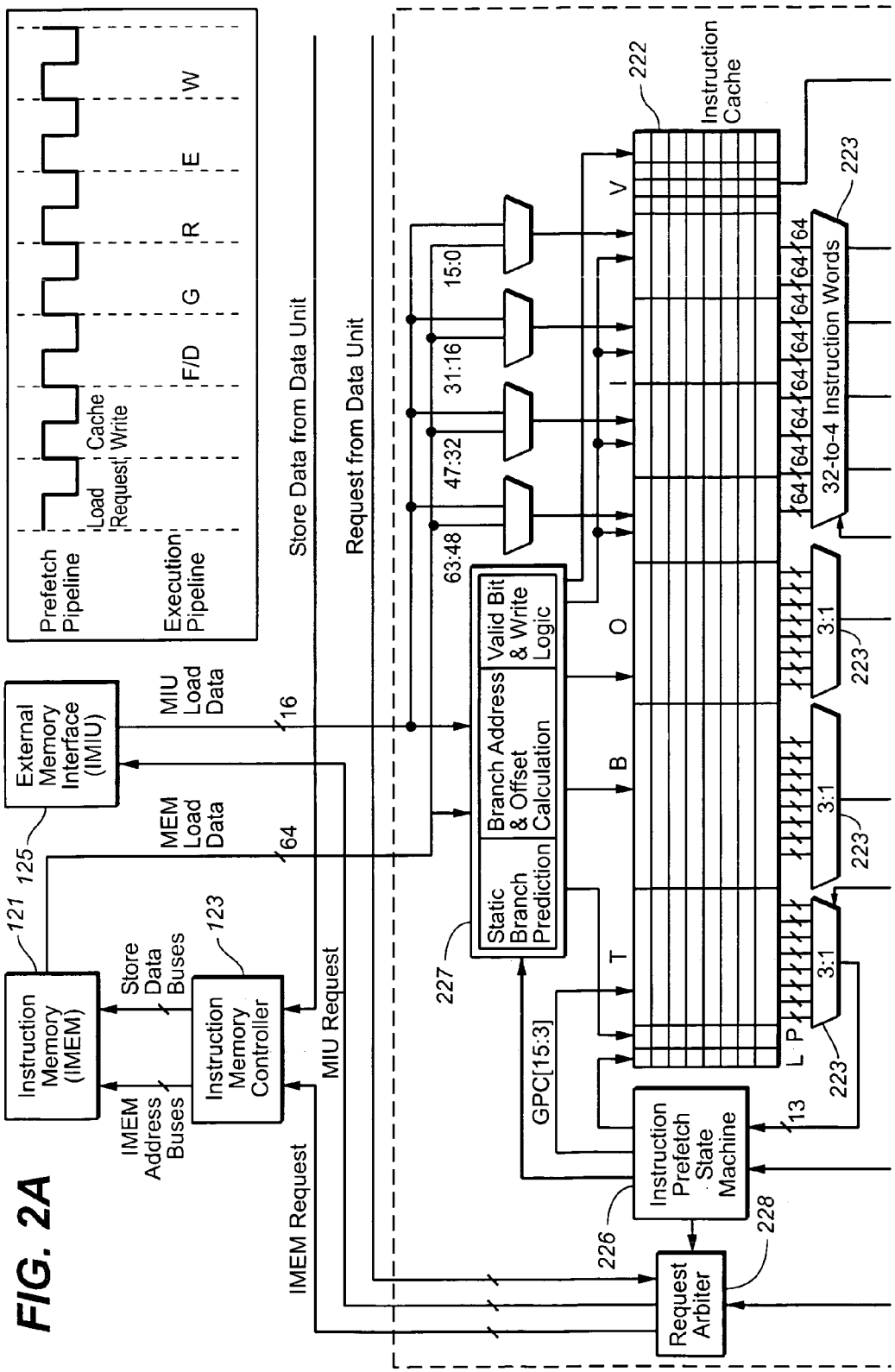
FIG. 2 illustrates an instruction unit within the exemplary DSP of FIG. 1 within which an instruction prefetch mechanism constructed according to the principles of the present invention can more specifically operate.
Figures 2, 2B:
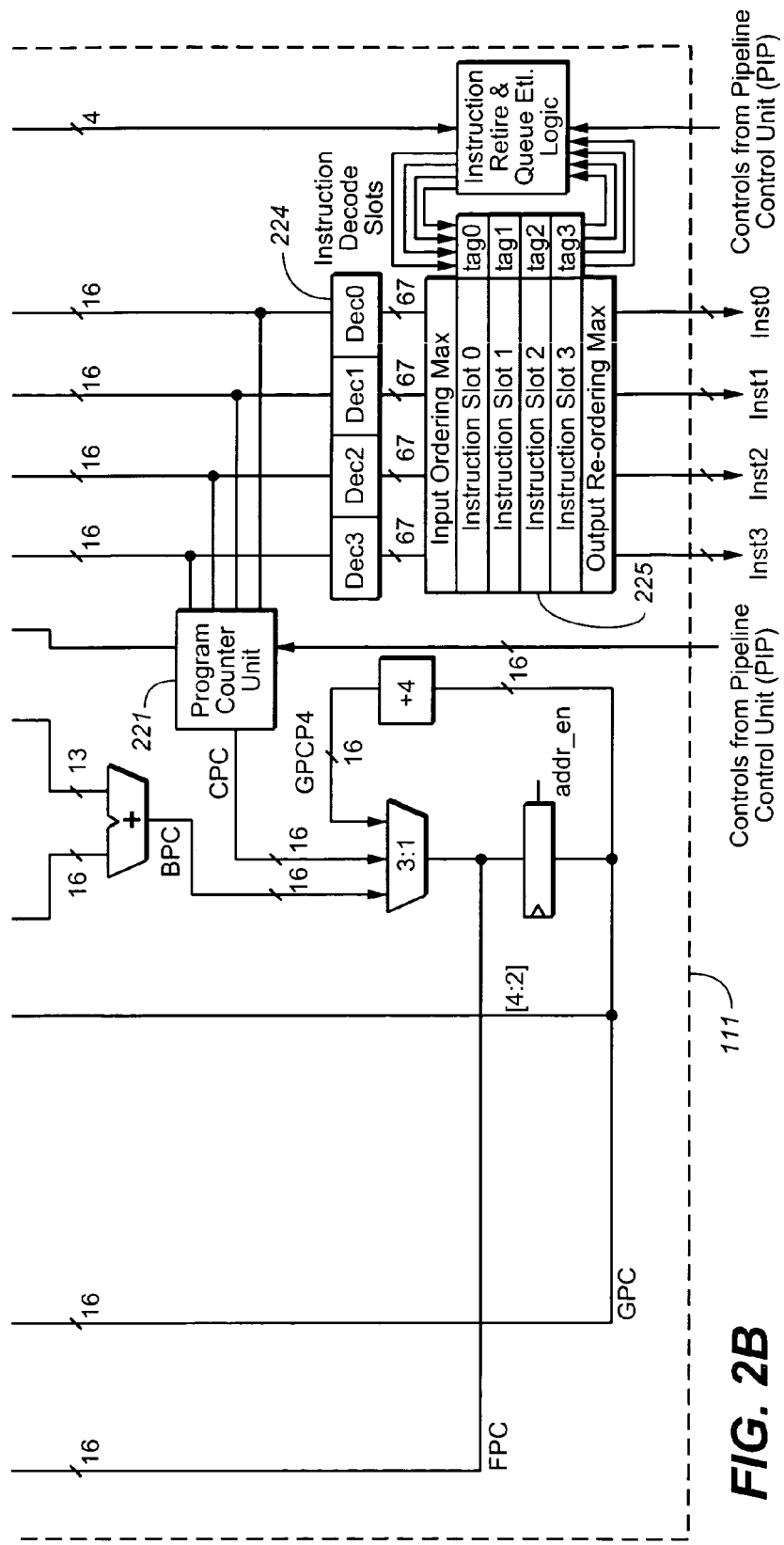

Since the instruction prefetch mechanism best resides within the instruction unit 111, the structure and function of the instruction unit 111 will now be set forth in greater detail. Accordingly, turning now to FIG. 2, illustrated in greater detail is the instruction unit 111 within the DSP of FIG. 1 within which an instruction prefetch mechanism constructed according to the principles of the present invention can more specifically operate.

The instruction unit 111 interacts with, among other things, the instruction memory 121, the instruction memory controller 123 and the external memory interface 125, all of FIG. 1. The instruction unit 111 loads instructions from either the instruction memory 121 or the external memory via the external memory interface 125. The instructions (which are each 16 bits wide) and associated tags and addresses (which will be explained in greater detail below) are loaded four-wide into an instruction cache 222.

The instruction cache 222 has an eight-line, 64-bit-wide instruction space that holds a line of four, 16-bit instructions side-by-side. The instruction cache 222 further provides, for each line of instructions, control space for a cache line valid bit L, a static branch predicted taken bit P, 13 cache tag bits, 16 branch instruction base address bits, 13 branch instruction offset bits and four word valid bits. Control logic 227 (including static branch prediction logic, branch instruction base address and offset calculation logic and valid bit and write logic) provides most of the bits that occupy the control space in each line of the instruction cache 222.

Selection logic 223 is driven to select one of the instruction cache's eight lines of instructions for execution. The control space associated with that line is employed to govern subsequent handling of the associated instructions as they are decoded (in decode slots 224) and loaded into instruction slots 225 for ultimate execution.

FIG. 2 further illustrates an instruction prefetch state machine 226, which is the form in which the instruction prefetch mechanism constructed according to the principles of the present invention exists in the exemplary instruction unit 111 of FIG. 2. The instruction prefetch state machine 226 takes, as its inputs, tag bits from a selected line in the instruction cache 222 and a program counter value derived from the program counter unit 221. The instruction prefetch state machine 226 produces, as its outputs, data to drive the static branch prediction logic within the control logic 227, a portion of the program counter value as cache tag bits, the cache line valid bit and data to drive a request arbiter 228 (which, in turn, decides how memory load requests are to be routed).

Figure 3:
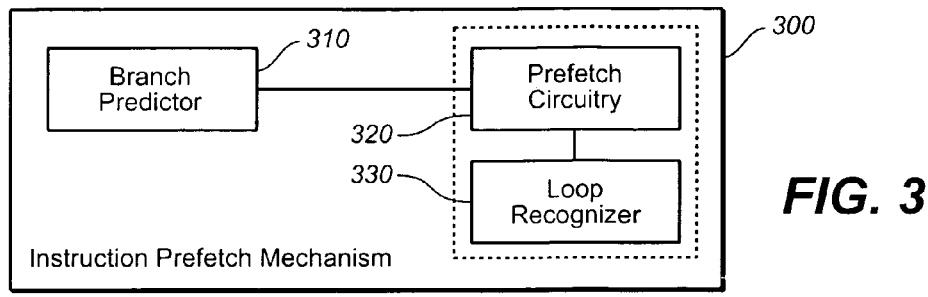
FIG. 3 illustrates a block diagram of an instruction prefetch mechanism constructed according to the principles of the present invention.

Turning now to FIG. 3, illustrated is a block diagram of an instruction prefetch mechanism, generally designated 300, constructed according to the principles of the present invention. The instruction prefetch mechanism 300 includes a branch predictor 310. The branch predictor 310 is illustrated as being a static branch predictor, but may be another conventional or later-discovered type. The branch predictor 310 predicts whether a branch is to be taken or not taken, typically based on experience with each particular branch. If the branch predictor 310 makes a correct prediction, significant time can be saved by prefetching instructions in accordance with the prediction. If the branch predictor 310 mispredicts, any prefetched instructions must be flushed, and instructions associated with the correct branch loaded in their stead.

FIG. 3 further shows prefetch circuitry 320. The prefetch circuitry 320 is coupled to the branch predictor 310 to receive data therefrom that indicates whether a particular branch is predicted to be taken or not taken. In response, the prefetch circuitry 320 employs a target base address and offset to prefetch the associated instructions. The specific prefetching schema will be described in greater detail in conjunction with FIG. 4, below.

FIG. 3 also illustrates a loop recognizer 330 coupled to the prefetch circuitry 320. The loop recognizer 330 may be, and in the illustrated embodiment is, part of the prefetch circuitry 320 itself, inasmuch as they are both embodied in a state machine. This is represented by the broken line surrounding both the prefetch circuitry 320 and the loop recognizer 330.

The primary function of the loop recognizer 330 is to keep the instructions that are in a loop in fast memory to increase execution speed and avoid power consumption incurred when instructions are loaded from the external memory. Accordingly, the loop recognizer 330 parses instructions to identify those that bound a loop. The specific instructions that bound a loop differ depending upon the particular instruction set concerned and upon the structure of a given program, but the identity and function of such instructions are well known to those skilled in the pertinent art.

When the loop recognizer 330 identifies a loop, it responds in two ways. First, the loop recognizer 330 disables the prefetch circuitry 320 with respect to prefetching instructions outside of the loop. This has the effect of preventing overwrites of instructions in the loop by instructions outside of the loop. Second, the loop recognizer 330 reinstates the validity of the instructions in the loop (via the cache line valid bit in the instruction cache 222 of FIG. 2). The loop recognizer 330 continues selectively to disable the prefetch circuitry 320 and reinstate the validity of the instructions in the loop until the loop completes execution. At that time, operation of the instruction prefetch mechanism 300 returns to normal.

Figure 4:
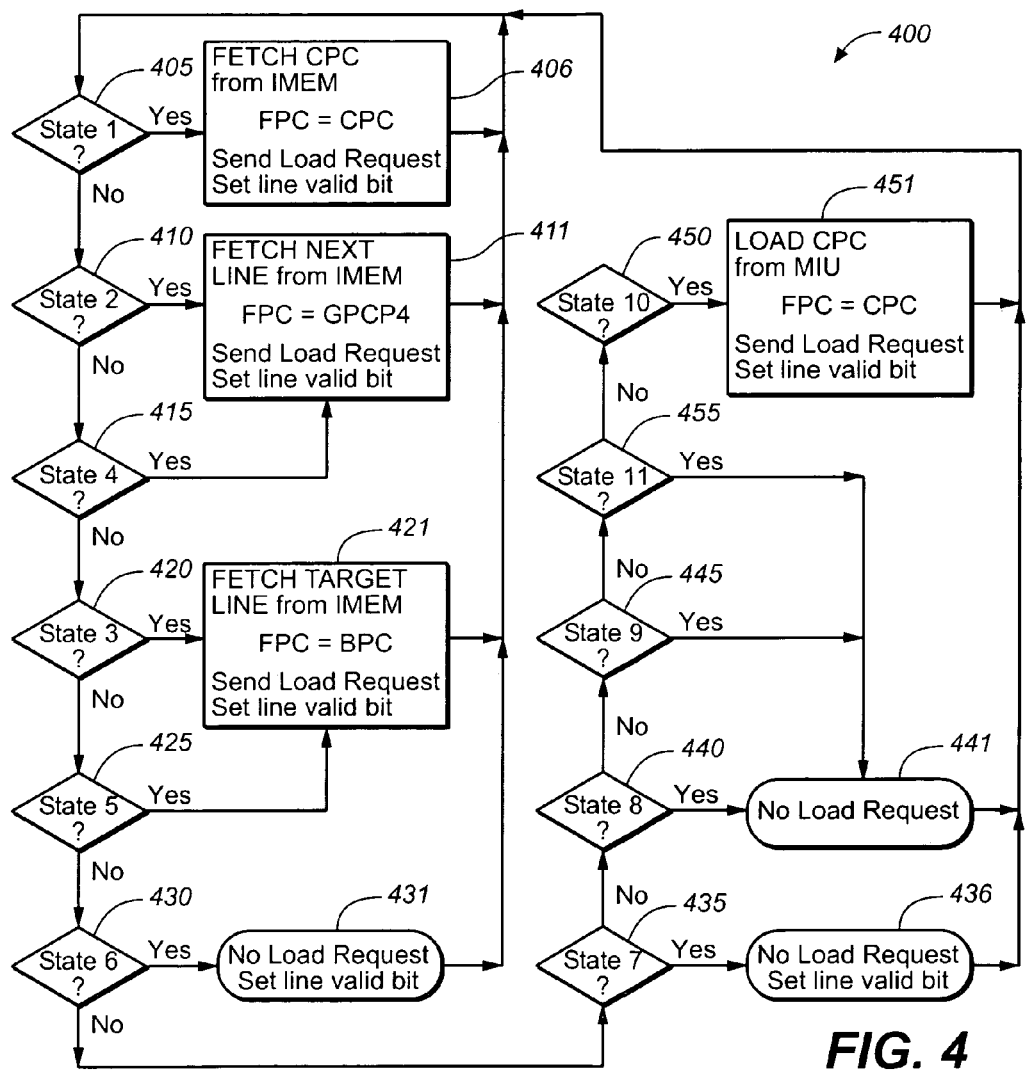
FIG. 4 illustrates a state diagram of a method of prefetching instructions carried out according to the principles of the present invention.

Turning now to FIG. 4, illustrated is a state diagram of a method, generally designated 400, of prefetching instructions carried out according to the principles of the present invention. The method 400 is illustrated as being carried out in a state machine, so there is no beginning step, per se. Instead, the method will be described with reference to a first state 405, with the understanding that it is "first" only in name.

The first state 405 occurs when the instruction cache does not contain a valid line of instructions that corresponds to the current value of the program counter, but the instruction memory (121 of FIG. 1) does. In such state, conventional fetch circuitry fetches the line from the instruction memory, loads the line into the instruction cache and sets the corresponding cache line valid bit (a step 406).

A second state 410 occurs when a line of instructions that corresponds to the current value of the program counter is being fetched, and the next line of instructions is contained in the instruction memory. In such state, the prefetch circuitry prefetches the line from the instruction memory, loads the line into the instruction cache and sets the corresponding cache line valid bit (a step 411).

A third state 415 occurs when a line of instructions that corresponds to the current value of the program counter is being fetched, and the branch predictor predicts a branch taken for which the instruction cache does not contain instructions but the instruction memory does, and further that the instruction cache has a line that is available for loading. In such state, the prefetch circuitry prefetches the appropriate line from the instruction memory, loads the line into the instruction cache and sets the corresponding cache line valid bit (a step 421).

A fourth state 420 occurs when a line of instructions that corresponds to the current value of the program counter is being fetched, and instructions in a branch previously predicted as having been taken are not in either the group or the read (the first two) stages of the pipeline, and the instruction cache does not contain a valid line of instructions that corresponds to the current value of the program counter, but the instruction memory does. In such state, the prefetch circuitry prefetches the appropriate line from the instruction memory, loads the line into the instruction cache and sets the corresponding cache line valid bit (the step 411).

A fifth state 425 occurs when a line of instructions that corresponds to the current value of the program counter is being fetched, and the branch predictor predicts a branch taken for which the instruction cache does not contain instructions but the instruction memory does, and the target line of the branch taken is being replaced by other conditions. In such state, the prefetch circuitry prefetches the appropriate line from the instruction memory, loads the line into the instruction cache and sets the corresponding cache line valid bit (the step 421).

A sixth state 430 occurs during a loop, when a line of instructions that corresponds to the current value of the program counter is being fetched, no branch taken is predicted, or the next line is already in the instruction cache. In such state, the prefetch circuitry is disabled, and the cache line valid bit corresponding to the next line (which is already in the instruction cache) is set (if not already set). This prevents that line from having to be reloaded into the instruction cache at a later time (a step 431).

A seventh state 435 also occurs during a loop, when a line of instructions that corresponds to the current value of the program counter is being fetched, and the next line, corresponding to a previous branch predicted taken, is in the instruction cache. In such state, the prefetch circuitry is disabled, and the cache line valid bit corresponding to the next line is set (if not already set). As before, this prevents that line from having to be reloaded into the instruction cache at a later time (a step 436).

An eighth state 440 occurs during a cache conflict, when a line of instructions that corresponds to the current value of the program counter is being fetched, no branch taken is predicted, the next line is not in the instruction cache, but is in the instruction memory, but the instruction cache is not available to receive another line. In such state, the prefetch circuitry is disabled; no prefetch occurs (a step 441).

A ninth state 445 occurs when a line of instructions that corresponds to the current value of the program counter is being fetched, and the next line, corresponding to a previous branch predicted taken, is not in the instruction cache, but is in the instruction memory, but the instruction cache is not available to receive another line. In such state, the prefetch circuitry is disabled; no prefetch occurs (the step 441).

A tenth state 450 occurs when neither the instruction cache nor the instruction memory contains a line of instructions that corresponds to the current value of the program counter, and the external memory interface (125 of FIG. 1) has not issued a load request. In such state, the prefetch circuitry prefetches the line from the external memory via the external memory interface (a step step 451).

An eleventh state 455 occurs when neither the instruction cache nor the instruction memory contains a line of instructions that corresponds to the current value of the program counter, but the external memory interface (125 of FIG. 1) has issued a load request. In such state, the prefetch circuitry is disabled; no prefetch occurs (the step 441).

Although the present invention has been described in detail, those skilled in the art should understand that they can make various changes, substitutions and alterations herein without departing from the spirit and scope of the invention in its broadest form.

What is claimed is:

1. For use in a processor having an external memory interface, an instruction prefetch mechanism, comprising:
   a branch predictor that predicts whether a branch is to be taken;
   prefetch circuitry, coupled to said branch predictor, that prefetches instructions associated with said branch via said external memory interface if said branch is taken and prefetches sequential instructions via said external memory interface if said branch is not taken;
   an instruction cache, coupled to said prefetch circuitry, that stores said fetched instructions; and
   a loop recognizer, coupled to said prefetch circuitry, that determines whether a loop is present in fetched instructions in said instruction cache, reinstates a validity of said fetched instructions in said loop, and prevents said prefetch circuitry from prefetching any instructions following a last instruction in said loop until said loop completes execution.

2. The mechanism as recited in claim 1 wherein said external memory interface is a synchronous memory interface.

3. The mechanism as recited in claim 1 wherein said prefetch circuitry prefetches four of said instructions at a time.

4. The mechanism as recited in claim 1 wherein said prefetch circuitry causes said instructions to be placed in a direct mapped instruction cache in said processor.

5. The mechanism as recited in claim 1 wherein said prefetch circuitry drives a request arbiter in said processor.

6. The mechanism as recited in claim 1 wherein said prefetch circuitry is embodied in a state machine.

7. The mechanism as recited in claim 1 wherein said processor is a digital signal processor.

8. A method of prefetching instructions for a processor, comprising:
   predicting whether a branch is to be taken;
   prefetching instructions associated with said branch if said branch is taken;
   prefetching sequential instructions if said branch is not taken;
   storing said prefetched instructions in an instruction cache;
   determining whether a loop is present in fetched instructions in said instruction cache;
   reinstating a validity of said fetched instructions in said loop until said loop completes execution; and
   preventing said prefetch circuitry from prefetching any instructions following a last instruction in said loop until said loop completes execution.

9. The method as recited in claim 8 wherein said prefetching is carried out via a synchronous memory interface.

10. The method as recited in claim 8 wherein said prefetching is carried out with four of said instructions at a time.

11. The method as recited in claim 8 further comprising causing said instructions to be placed in a direct mapped instruction cache in said processor.

12. The method as recited in claim 8 further comprising driving a request arbiter in said processor.

13. The method as recited in claim 8 wherein said prefetching is carried out in a state machine.

14. The method as recited in claim 8 wherein said processor is a digital signal processor.

15. A digital signal processor, comprising:
- an execution core having an instruction cache;
- a memory unit coupled to said execution core and having an instruction memory and an external memory interface;
- a branch predictor, coupled to said instruction cache, that predicts whether a branch is to be taken;
- prefetch circuitry, coupled to said branch predictor, that prefetches instructions associated with said branch via said external memory interface if said branch is taken and prefetches sequential instructions via said external memory interface if said branch is not taken;
- an instruction cache, coupled to said prefetch circuitry, that store said fetched instructions; and
- a loop recognizer, coupled to said prefetch circuitry, that determines whether a loop is present in fetched instructions in said instruction cache, reinstates a validity of said fetched instructions in said loop, and prevents said prefetch circuitry from prefetching any instructions following a last instruction in said loop until said loop completes execution.

16. The digital signal processor as recited in claim 15 wherein said external memory interface is a synchronous memory interface.

17. The digital signal processor as recited in claim 15 wherein said prefetch circuitry prefetches four of said instructions at a time.

18. The digital signal processor as recited in claim 15 wherein said prefetch circuitry causes said instructions to be placed in a direct mapped instruction cache in said processor.

19. The digital signal processor as recited in claim 15 wherein said prefetch circuitry drives a request arbiter in said processor.

20. The digital signal processor as recited in claim 15 wherein said prefetch circuitry is embodied in a state machine.

* * * * *